United States Patent
Niu et al.

(10) Patent No.: US 9,917,724 B2
(45) Date of Patent: Mar. 13, 2018

(54) ACCESS METHOD AND SYSTEM OF CUSTOMER PREMISE EQUIPMENT, AND BROADBAND NETWORK GATEWAY

(71) Applicant: Huawei Technologies Co., Ltd., Shenzhen (CN)

(72) Inventors: Lehong Niu, Shenzhen (CN); Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 460 days.

(21) Appl. No.: 13/774,532

(22) Filed: Feb. 22, 2013

(65) Prior Publication Data
US 2014/0071811 A1    Mar. 13, 2014

(30) Foreign Application Priority Data
Feb. 22, 2012   (CN) .......................... 2012 1 0041011

(51) Int. Cl.
*H04L 12/24*   (2006.01)
*H04L 12/28*   (2006.01)
*H04L 29/06*   (2006.01)

(52) U.S. Cl.
CPC ...... *H04L 41/0654* (2013.01); *H04L 12/2876* (2013.01); *H04L 41/0893* (2013.01); *H04L 63/10* (2013.01)

(58) Field of Classification Search
None
See application file for complete search history.

(56) References Cited

U.S. PATENT DOCUMENTS 8,165,156 B1 *  4/2012  Melsen ............... H04L 12/2881
                                                      370/466
9,614,810 B2 *  4/2017  Niu ..................... H04L 61/2015
(Continued)

FOREIGN PATENT DOCUMENTS

CN   101656712 A   2/2010
CN   102025528 A   4/2011
(Continued)

OTHER PUBLICATIONS

European Search Report issued in corresponding European Patent Application No. 13156314.0, dated Jul. 22, 2013, 6 pages.

*Primary Examiner* — Robert C Scheibel
(74) *Attorney, Agent, or Firm* — Brinks Gilson & Lione

(57) ABSTRACT

The present invention provides an access method and system of a customer premise equipment, and a broadband network gateway. The access method of a customer premise equipment includes: receiving, by a BNG in a BNG pool, an access request packet sent by a CPE, where the access request packet carries an identifier of a CPE group to which the CPE belongs; and obtaining, by the BNG, an access policy of the CPE group according to the identifier of the CPE group, and performing access control on the CPE according to the access policy. Through the present invention, a BNG in a BNG pool is enabled to provide an access service for a CPE according to an access policy, so that when a BNG in a BNG pool is faulty, a BNG that is not faulty in the BNG pool can provide an access service for a CPE originally accessing the faulty BNG, thereby improving the reliability of the entire network.

30 Claims, 10 Drawing Sheets

(56) References Cited

U.S. PATENT DOCUMENTS

| | | | |
|---|---|---|---|
| 2008/0229403 A1* | 9/2008 | Oswal | H04W 12/06 726/12 |
| 2009/0103545 A1* | 4/2009 | Anschutz et al. | 370/395.4 |
| 2009/0207757 A1* | 8/2009 | Andreasen | H04L 12/1403 370/254 |
| 2009/0219831 A1* | 9/2009 | Shaker et al. | 370/254 |
| 2010/0106791 A1* | 4/2010 | Dai | H04L 12/465 709/206 |
| 2010/0303092 A1* | 12/2010 | Chinnaswamy | H04L 41/0806 370/465 |
| 2011/0026502 A1* | 2/2011 | Harmatos et al. | 370/338 |
| 2012/0198096 A1* | 8/2012 | Leng | H04L 12/2856 709/245 |
| 2013/0107699 A1* | 5/2013 | Miclea | 370/228 |
| 2014/0325090 A1* | 10/2014 | Michelin et al. | 709/245 |

FOREIGN PATENT DOCUMENTS

| | | |
|---|---|---|
| CN | 102223672 A | 10/2011 |
| WO | WO 2009092441 A1 | 7/2009 |

\* cited by examiner

ACCESS METHOD AND SYSTEM OF CUSTOMER PREMISE EQUIPMENT, AND BROADBAND NETWORK GATEWAY

CROSS-REFERENCE TO RELATED APPLICATIONS

This application claims priority to Chinese Patent Application No. 201210041011.5, filed on Feb. 22, 2012, which is hereby incorporated by reference in its entirety.

FIELD OF THE INVENTION

The present invention relates to communications technologies, and in particular, to an access method and system of a customer premise equipment, and a broadband network gateway.

BACKGROUND OF THE INVENTION

A customer premise equipment (Customer Premise Equipment, hereinafter briefly referred to as CPE) is connected to an access node (Access Node, hereinafter briefly referred to as AN) by using various access technologies such as a digital subscriber line (Digital Subscriber Line, hereinafter briefly referred to as DSL) or a passive optical network (Passive Optical Network, hereinafter briefly referred to as PON) technology; and one or more metro Ethernet switches (Metro Ethernet Switch) aggregate uplink traffic of multiple ANs to a broadband network gateway (Broadband Network Gateway, hereinafter briefly referred to as BNG). The BNG implements a function of controlling access of the CPE: only when a CPE is legal, the BNG forwards uplink traffic of the legal CPE to an aggregation router (Aggregation Router), and the aggregation router sends the uplink traffic of the legal CPE to an Internet protocol (Internet Protocol, hereinafter briefly referred to as IP) network. Likewise, downlink traffic from the IP network to the CPE is also controlled by the BNG.

When the BNG dynamically allocates an address for the CPE, the BNG also manages multiple address pools for allocating an IP address for a legal CPE.

A layer 2 Ethernet network exists between the AN and the BNG, and in order to ensure isolation of traffic of different CPEs between the AN and the BNG, the AN marks an uplink Ethernet frame of the CPE with a layer 2 virtual local area network tag (Virtual Local Area Network tag, hereinafter briefly referred to as VLAN tag) that uniquely identifies the CPE, which is a service virtual local area network tag (Service VLAN tag, hereinafter briefly referred to as S-vlan tag) and a customer virtual local area network tag (Customer VLAN tag, hereinafter briefly referred to as C-vlan tag). The BNG recognizes traffic of different CPEs through the S-vlan tag and the C-vlan tag, and forwards, to the IP network, an IP packet from which the S-vlan tag and the C-vlan tag have been removed; for a downlink packet from the IP network to the CPE, the BNG adds the S-vlan tag and the C-vlan tag to the downlink packet to generate an Ethernet frame, and sends the Ethernet frame to the AN. Likewise, the AN recognizes, through the S-vlan tag and the C-vlan tag, Ethernet frames sent to different CPEs, and sends, to the CPE, the Ethernet frames from which the S-vlan tag and the C-vlan tag have been removed.

However, in the prior art, BNGs separately provide an access service for CPEs, so that when a BNG is faulty, no other BNGs provide an access service for the CPE originally accessing the faulty BNG, resulting in low reliability of the entire network.

SUMMARY OF THE INVENTION

The present invention provides an access method and system of a customer premise equipment, and a broadband network gateway, to enable a broadband network gateway in a broadband network gateway pool to provide an access service for a customer premise equipment according to an access policy, thereby improving reliability of the network.

In one aspect, the present invention provides an access method of a customer premise equipment, including:

receiving, by a broadband network gateway in a broadband network gateway pool, an access request packet sent by a customer premise equipment, where the access request packet carries an identifier of a customer premise equipment group to which the customer premise equipment belongs; and obtaining, by the broadband network gateway, an access policy of the customer premise equipment group according to the identifier of the customer premise equipment group, and performing access control on the customer premise equipment according to the access policy.

In another aspect, the present invention provides a broadband network gateway, including:

a receiver, configured to receive an access request packet sent by a customer premise equipment, where the access request packet carries an identifier of a customer premise equipment group to which the customer premise equipment belongs;

an obtaining module, configured to obtain an access policy of the customer premise equipment group according to the identifier of the customer premise equipment group received by the receiver; and a control module, configured to perform access control on the customer premise equipment according to the access policy obtained by the obtaining module.

In still another aspect, the present invention provides an access system of a customer premise equipment, including a customer premise equipment and at least two broadband network gateways as described above.

The embodiments of the present invention have the following technical effects. After receiving an access request packet sent by a customer premise equipment that carries an identifier of a customer premise equipment group to which the customer premise equipment belongs, a broadband network gateway in a broadband network gateway pool obtains an access policy of the customer premise equipment group according to the identifier of the customer premise equipment group, and then performs access control on the customer premise equipment according to the access policy. In this way, a broadband network gateway in a broadband network gateway pool is enabled to provide an access service for a customer premise equipment according to an access policy, so that when a broadband network gateway in a broadband network gateway pool is faulty, a broadband network gateway that is not faulty in the broadband network gateway pool can provide an access service for a customer premise equipment originally accessing the faulty broadband network gateway, thereby improving the reliability of the entire network.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person skilled in the art can derive other drawings from these accompanying drawings without creative efforts.

DETAILED DESCRIPTION OF THE EMBODIMENTS

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by a person skilled in the art based on the embodiments of the present invention without creative efforts shall fall within the protection scope of the present invention.

Figure 1:
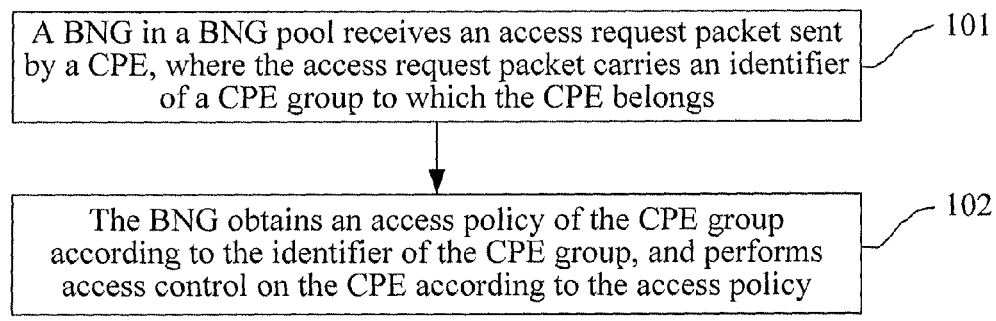
FIG. 1 is a flow chart of an embodiment of an access method of a customer premise equipment according to the present invention.

FIG. 1 is a flow chart of an embodiment of an access method of a customer premise equipment according to the present invention. As shown in FIG. 1, the access method of a customer premise equipment may include:

Step 101: A BNG in a BNG pool receives an access request packet sent by a CPE, where the access request packet carries an identifier of a CPE group to which the CPE belongs.

In this embodiment, the access request packet may be a dynamic host configuration protocol (Dynamic Host Configuration Protocol, hereinafter briefly referred to as DHCP) discover packet, and the identifier of the CPE group to which the CPE belongs may be a service virtual local area network tag (S-vlan tag).

Step 102: The BNG obtains an access policy of the CPE group according to the identifier of the CPE group, and performs access control on the CPE according to the access policy.

The access policy of the CPE group refers to an access priority of the CPE group on each BNG. Specifically, the performing access control on the CPE according to the access policy may be: according to the access policy, if a BNG has the highest access priority for the CPE group, allowing, by the BNG, the CPE to access the BNG. In addition, if the BNG does not have the highest access priority for the CPE group, the BNG discards the access request packet.

In the above embodiment, after a BNG in a BNG pool receives an access request packet sent by a CPE that carries an identifier of a CPE group to which the CPE belongs, the BNG may obtain an access policy of the CPE group according to the identifier of the CPE group, and then perform access control on the CPE according to the access policy. In this way, a BNG in a BNG pool is enabled to provide an access service for a CPE according to an access policy, so that when a BNG in a BNG pool is faulty, a BNG that is not faulty in the BNG pool can provide an access service for a CPE originally accessing the faulty BNG, thereby improving the reliability of the entire network.

In another embodiment of the present invention, further, after step 102, the embodiment of the present invention shown in FIG. 1 may also include: if the BNG allows the CPE to access the BNG, allocating, by the BNG, an address from an address pool for the CPE according to an address pool management policy, and sending the address allocated for the CPE and an address of the BNG to the CPE, so that the CPE accesses the BNG.

Specifically, the allocating, by the BNG the address from the address pool for the CPE according to an address pool management policy may be: allocating, by the BNG, the address from an address pool for which the BNG has the highest management priority, for the CPE according to the address pool management policy.

In still another embodiment of the present invention, further, after step 102 in the embodiment of the present invention shown in FIG. 1, if the BNG allows the CPE to access the BNG, the BNG may further determine a backup BNG of the CPE group according to the access policy of the CPE group, and send access information of the CPE to the backup BNG. Specifically, the determining, by the BNG, the backup BNG of the CPE group according to the access policy of the CPE group may be: determining, by the BNG according to the access policy of the CPE group, that a BNG having the second highest access priority for the CPE group is the backup BNG of the CPE group.

In still another embodiment of the present invention, when it is detected that a first BNG in the BNG pool is faulty, one or more BNGs in the BNG pool except the first BNG update the address pool management policy, take over an address pool affected by the first BNG, and advertise a network segment route of the taken-over address pool to an aggregation router.

Specifically, the address pool affected by the first BNG refers to an address pool for which the first BNG has the highest management priority before the fault occurs. It is assumed that, for an address pool P, the management priority on the first BNG is 100, and the management priority on the second BNG is 60; for an address pool M, the management priority on the first BNG is 80, and the management priority on the second BNG is 100, and only the first BNG is faulty in the entire BNG pool. In this case, when the first BNG is faulty, because the management priority of the address pool P on the first BNG is the highest, the address pool P is the address pool affected by the first BNG; in addition, because the management priority of the address pool M on the first BNG is not the highest, the address pool M is not the address pool affected by the first BNG.

Specifically, the updating the address pool management policy may be:

lowering the management priority of the first BNG for all address pools to the lowest.

Specifically, the taking over the address pool affected by the first BNG may be:

taking over, by a second BNG among the one or more BNGs, the address pool affected by the first BNG, where the second BNG is a BNG currently having the highest management priority for the address pool affected by the first BNG. Here, "currently" refers to a state that the first BNG in the BNG pool is faulty, no other BNGs in the BNG pool are faulty except the first BNG and one or more BNGs in the BNG pool except the first BNG already update the address pool management policy.

In still another embodiment of the present invention, when it is detected that a first BNG in the BNG pool is faulty, one or more BNGs in the BNG pool except the first BNG update the access policy, and take over a CPE group affected by the first BNG.

Specifically, the CPE group affected by the first BNG refers to a CPE group for which the first BNG has the highest access priority before the fault occurs.

Specifically, the updating the access policy may be:

lowering the access priority of the first BNG for all CPE groups to the lowest.

Specifically, the taking over the CPE group affected by the first BNG may be: allowing, by a second BNG among the one or more BNGs, a CPE in the CPE group affected by the first BNG to access the second BNG, where the second BNG is a BNG currently having the highest access priority for the CPE group affected by the first BNG. Here, "currently" refers to a state that the first BNG in the BNG pool is faulty, no other BNGs in the BNG pool are faulty except the first BNG, and one or more BNGs in the BNG pool except the first BNG already update the access policy.

The CPE group may be a service virtual local area network (Service VLAN, hereinafter briefly referred to as SVLAN); in such case, the taking over the CPE group affected by the first BNG may be: reconstructing, by a second BNG determining that the second BNG currently has the highest access priority for the SVLAN affected by the first BNG among the one or more BNGs, data paths of all CPEs in the SVLAN according to access information of all the CPEs in the SVLAN which is stored in the second BNG.

Further, if a MAC address of the second BNG is different from that of the first BNG, the second BNG sends a gateway gratuitous address resolution protocol (Address Resolution Protocol, hereinafter briefly referred to as ARP) packet in a taken-over SVLAN and a customer virtual local area network (Customer VLAN, hereinafter briefly referred to as CVLAN) included in the taken-over SVLAN, where the gateway gratuitous ARP packet is used for notifying the MAC address of the second BNG, so that a metro Ethernet switch learns the MAC address of the second BNG from a new port, and a CPE in the SVLAN refreshes a gateway ARP entry thereof according to the MAC address of the second BNG; or, if a MAC address of the second BNG is the same as that of the first BNG the second BNG sends a gateway gratuitous ARP packet in a taken-over SVLAN, where the gateway gratuitous ARP packet is used for notifying the MAC address of the second BNG, so that a metro Ethernet switch learns the MAC address of the second BNG from a new port.

The access method of a customer premise equipment provided by the present invention is introduced in detail below.

To ensure that a BNG still provides an access service for a CPE when one or more BNGs are faulty, multiple independent BNGs need to be combined to form a BNG pool (BNG pool), so as to jointly provide services for all CPEs.

In the present invention, each BNG in the BNG pool maintains a distributed CPE access policy, and each BNG in the BNG pool determines, according to the access policy, whether to provide an access service for a specified CPE. From the perspective of the entire BNG pool, a BNG for serving the CPE is selected according to the access policy.

Specifically, all the CPEs may be grouped into multiple CPE groups (CPE group), where the same CPE group supports the same access policy.

Grouping granularity of the CPE groups supports grouping according to an S-vlan tag+C-vlan tag or an S-vlan tag of packets, MAC addresses of CPEs or a DHCP version 4 option 82 (DHCP v4 option82), and the like, and the CPE groups are identified using the above information. For example, if the CPE groups are grouped according to an S-vlan tag, each CPE group has an identifier being an S-vlan tag, and the granularity of the CPE group is an SVLAN; if the CPE groups are grouped according to an S-vlan tag+C-vlan tag, each CPE group has an identifier being an S-vlan tag+C-vlan tag, and the granularity of the CPE group is a single CPE; if the CPE groups are grouped according to MAC addresses of CPEs, each CPE group has an identifier being a MAC address of a CPE, and the granularity of the CPE group is a single CPE.

The distributed CPE access policy is used for selecting a BNG for serving a specified CPE from all BNGs included in the BNG pool. A method for selecting a BNG for serving a specified CPE is implemented based on a priority: each BNG in the BNG pool sets a different access priority for each CPE group, where an access priority may be indicated by 100, 80, 60 or 40, and so on, as shown in Table 1. A larger value indicates a higher priority of the CPE group for access through the BNG. A CPE accesses through a BNG having the highest access priority for a CPE group to which the CPE belongs.

TABLE 1

|  | BNG1 | BNG2 | BNG3 | BNG4 |
| --- | --- | --- | --- | --- |
| CPE group 1 | 100 | 80 | 60 | 40 |
| CPE group 2 | 40 | 100 | 80 | 60 |
| CPE group 3 | 60 | 40 | 100 | 80 |
| CPE group 4 | 80 | 60 | 40 | 100 |

It should be noted that, the indication method shown in Table 1 is merely an example of access priorities, the present invention is not limited thereto, and the present invention does not limit the indication method of access priorities.

During the initialization of the BNG pool, it is supported to set a different access priority for each CPE group at each BNG in the BNG pool. A value of an access priority may dynamically change according to the state of the BNG. For example, when a BNG is faulty, the access priority of the faulty BNG for all the CPE groups is lowered to the lowest, for example, 0, indicating that the faulty BNG cannot provide access services for CPEs. In an example in which the BNG2 is faulty, compared with Table 1, the change of an access priority may be as shown in Table 2.

TABLE 2

|  | BNG1 | BNG2 | BNG3 | BNG4 |
|---|---|---|---|---|
| CPE group 1 | 100 | 0 | 60 | 40 |
| CPE group 2 | 40 | 0 | 80 | 60 |
| CPE group 3 | 60 | 0 | 100 | 80 |
| CPE group 4 | 80 | 0 | 40 | 100 |

In the present invention, in order to support the sharing of multiple address pool resources in the BNG pool, and ensure that when a BNG in the BNG pool is faulty, one or more BNGs in the BNG pool except the faulty BNG can take over the address pool resource affected by the faulty BNG, each BNG in the BNG pool maintains a distributed address pool management policy, where the address pool management policy is used for selecting a BNG for managing a specified address pool from all the BNGs in the BNG pool, and the selected BNG is responsible for managing address resources of the address pool, allocating an IP address from an address pool managed by the selected BNG, for a CPE accessing the BNG, and advertising a network segment route of the address pool.

Specifically, a method for selecting a BNG for managing a specified address pool from all the BNGs in the BNG pool may be implemented based on priorities: each BNG in the BNG pool sets different management priority for each address pool, where the management priority may be indicated by 100, 80, 60 or 40, and so on, as shown in Table 3. A larger value indicates a higher management priority of the BNG for the address pool, and the address pool is managed by a BNG having the highest management priority for the address pool.

TABLE 3

|  | BNG1 | BNG2 | BNG3 | BNG4 |
|---|---|---|---|---|
| Address pool 1 | 100 | 80 | 60 | 40 |
| Address pool 2 | 40 | 100 | 80 | 60 |
| Address pool 3 | 60 | 40 | 100 | 80 |
| Address pool 4 | 80 | 60 | 40 | 100 |

It should be noted that, the indication method shown in Table 3 is merely an example of management priority, the present invention is not limited thereto, and the present invention does not limit the indication method of management priority.

During the initialization of the BNG pool, it is supported to set a different management priority for each address pool at each BNG in the BNG pool. The value of the management priority may dynamically change according to the state of the BNG. For example, when a BNG is faulty, the management priority of the faulty BNG for all the address pools is lowered to the lowest, for example, 0, as shown in Table 4. Table 4 shows the change of a management priority compared with Table 3 in an example in which the BNG2 is faulty.

TABLE 4

|  | BNG1 | BNG2 | BNG3 | BNG4 |
|---|---|---|---|---|
| Address pool 1 | 100 | 0 | 60 | 40 |
| Address pool 2 | 40 | 0 | 80 | 60 |
| Address pool 3 | 60 | 0 | 100 | 80 |
| Address pool 4 | 80 | 0 | 40 | 100 |

Figure 2:
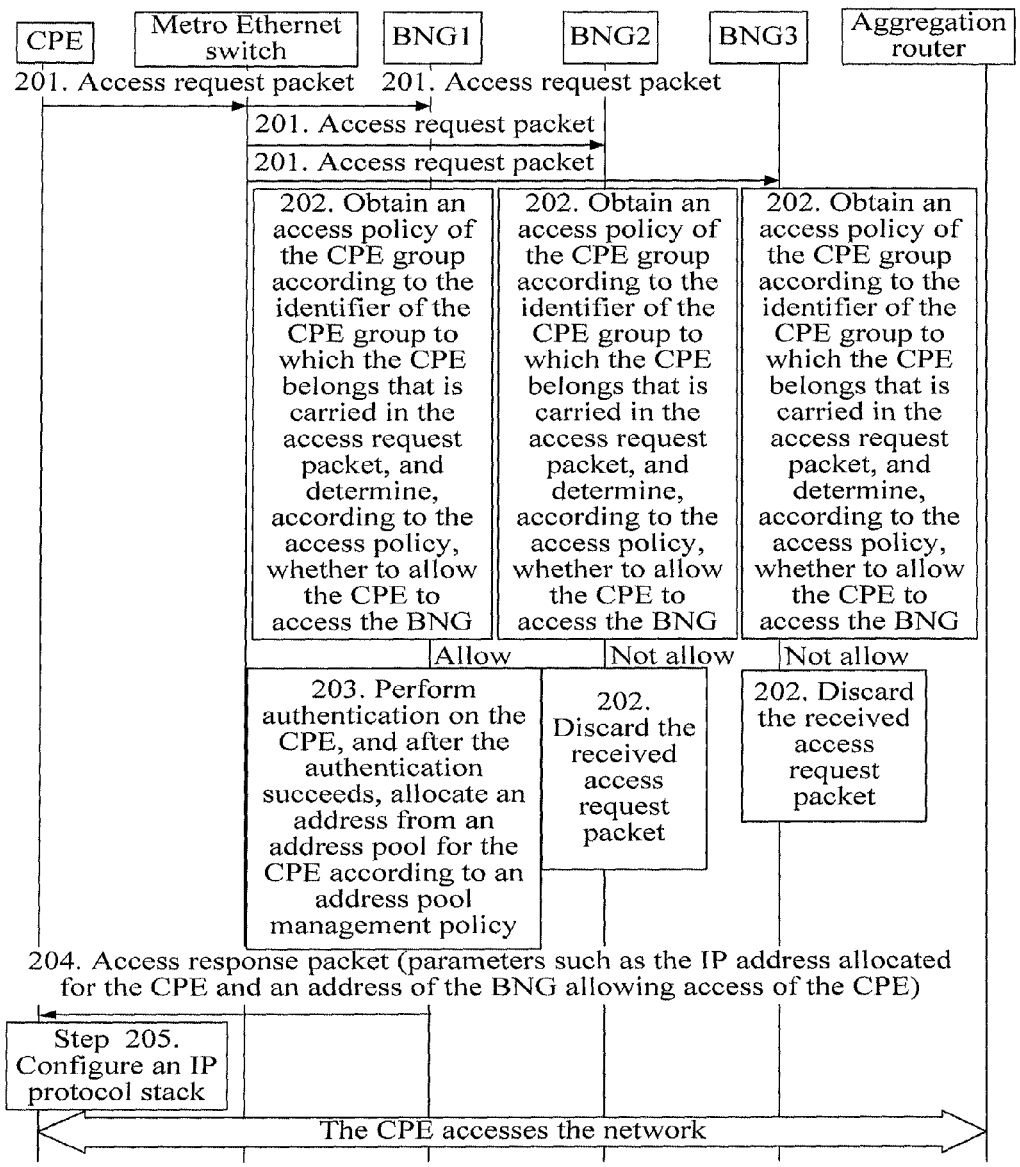
FIG. 2 is a flow chart of another embodiment of the access method of a customer premise equipment according to the present invention.

FIG. 2 is a flow chart of another embodiment of the access method of a customer premise equipment according to the present invention, where this embodiment is a further extension of the embodiment shown in FIG. 1. As shown in FIG. 2, the access method of a customer premise equipment may include:

Step 201: A CPE sends an access request packet to all BNGs in a BNG pool, where the access request packet is used for requesting access to a network.

Specifically, the CPE may broadcast the access request packet to all the BNGs in the BNG pool.

In this embodiment, the access request packet carries an identifier of a CPE group to which the CPE belongs; the access request packet varies with different access modes adopted by the CPE, where if the CPE adopts a point to point protocol over Ethernet (Point to Point Protocol over Ethernet, hereinafter briefly referred to as PPPOE) access mode, the access request packet is a PPPOE active discovery initiation (PPPoE Active Discovery Initiation, hereinafter briefly referred to as PADI) packet, and if the CPE adopts an access mode of Internet protocol over Ethernet (IP over Ethernet, hereinafter briefly referred to as IPOE)+DHCP version 4 (DHCP version 4, hereinafter briefly referred to as DHCPv4), the access request packet is a DHCP discover (DHCP discover) packet or a DHCP request (DHCP request) packet.

Step 202: After receiving the access request packet sent by the CPE, each BNG in the BNG pool obtains an access policy of the CPE group according to the identifier of the CPE group to which the CPE belongs that is carried in the access request packet, and determines, according to the access policy, whether to allow the CPE to access the BNG.

In this embodiment, the identifier of the CPE group varies with the grouping granularity of the CPE group. For example, if the CPE groups are grouped according to an S-vlan tag, each CPE group has an identifier being an S-vlan tag, and the granularity of the CPE group is an SVLAN; if the CPE groups are grouped according to an S-vlan tag+C-vlan tag, each CPE group has an identifier being an S-vlan tag+C-vlan tag, and the granularity of the CPE group is a single CPE; if the CPE groups are grouped according to MAC addresses of CPEs, each CPE group has an identifier being a MAC address of a CPE, and the granularity of the CPE group is a single CPE.

Specifically, the determining, according to the access policy, whether to allow the CPE to access the BNG may be: if the BNG determines that it has the highest access priority for the CPE group to which the CPE belongs, allowing, by the BNG according to the access policy, the CPE to access the BNG; otherwise, not allowing, by the BNG, the CPE to access the BNG, and discarding the received access request packet.

This step may be implemented with reference to the description of step 102.

Step 203: The BNG allowing access of the CPE performs authentication on the CPE, and after the authentication succeeds, allocates an address from an address pool for the CPE according to an address pool management policy.

Specifically, the allocating an address from an address pool for the CPE according to an address pool management policy may be: allocating, by the BNG allowing access of the CPE, an address from an address pool for which the BNG has the highest management priority, for the CPE according to the address pool management policy. The address may be an IP address.

Step 204: The BNG allowing access of the CPE sends an access response packet to the CPE, where the access response packet carries parameters such as the IP address allocated for the CPE and an address of the BNG allowing access of the CPE.

In this embodiment, the access response packet also varies with different access modes adopted by the CPE. If the CPE adopts the PPPOE access mode, the access response packet is a PPPOE active discovery session (PPPoE Active Discovery Session-confirmation, hereinafter briefly referred to as PADS) packet, and if the CPE adopts the access mode of IPOE+DHCPv4, the access response packet is a DHCP acknowledgement (DHCP Acknowledgement, hereinafter briefly referred to as DHCP ACK) packet.

Step 205: The CPE configures an IP protocol stack according to the parameters carried in the received access response packet, such as the IP address allocated for the CPE and the address of the BNG allowing access of the CPE. As such, the CPE can access the network, and communicate with other IP terminals on the network.

Through the above embodiment, a BNG in a BNG pool is enabled to provide an access service for a CPE according to an access policy, so that when a BNG in a BNG pool is faulty, a BNG that is not faulty in the BNG pool can provide an access service for a CPE originally accessing the faulty BNG, thereby improving the reliability of the entire network.

Figure 3:
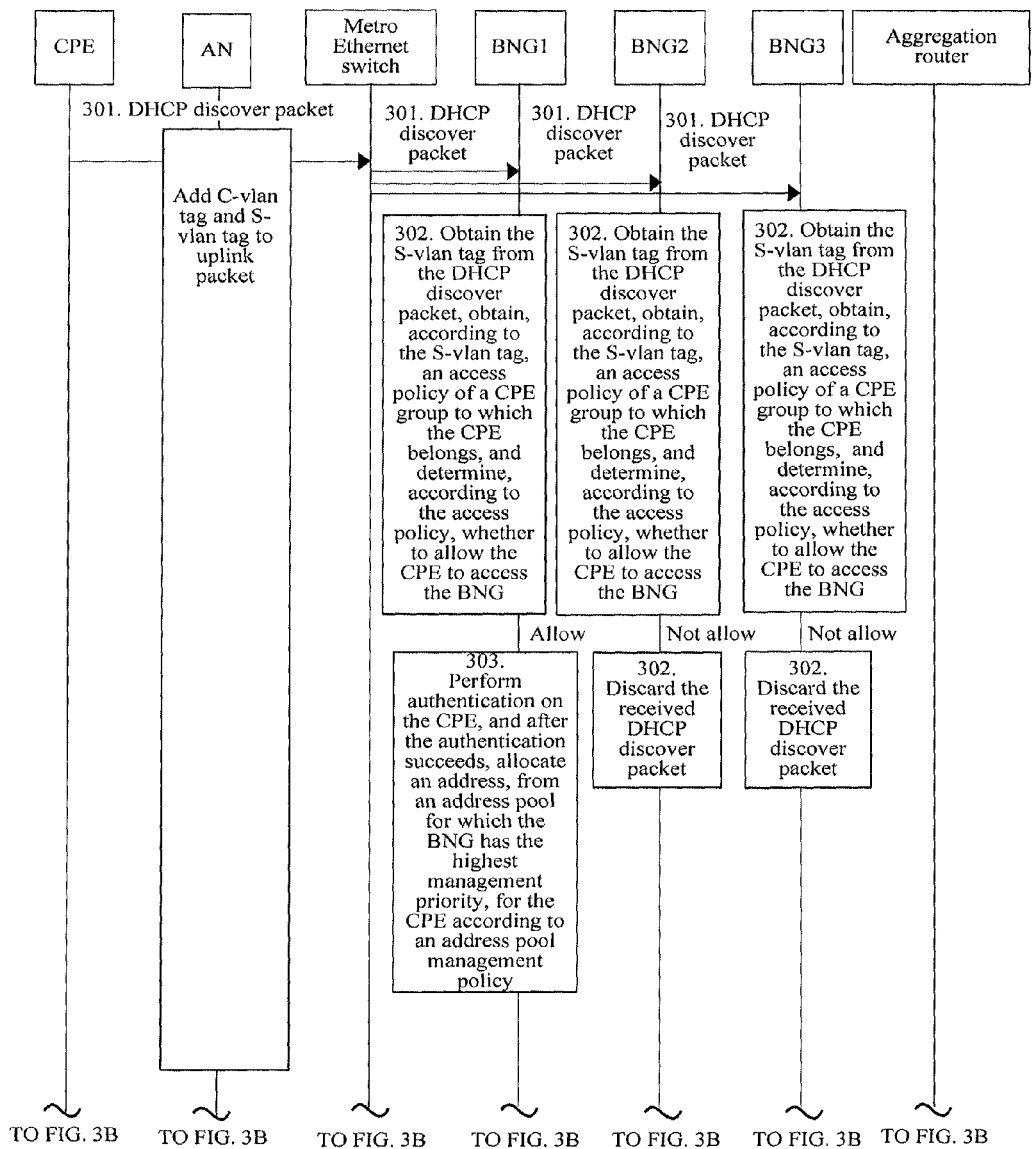
FIG. 3 and FIG. 3 (continued) illustrate a flow chart of still another embodiment of the access method of a customer premise equipment according to the present invention.
Figure 3:
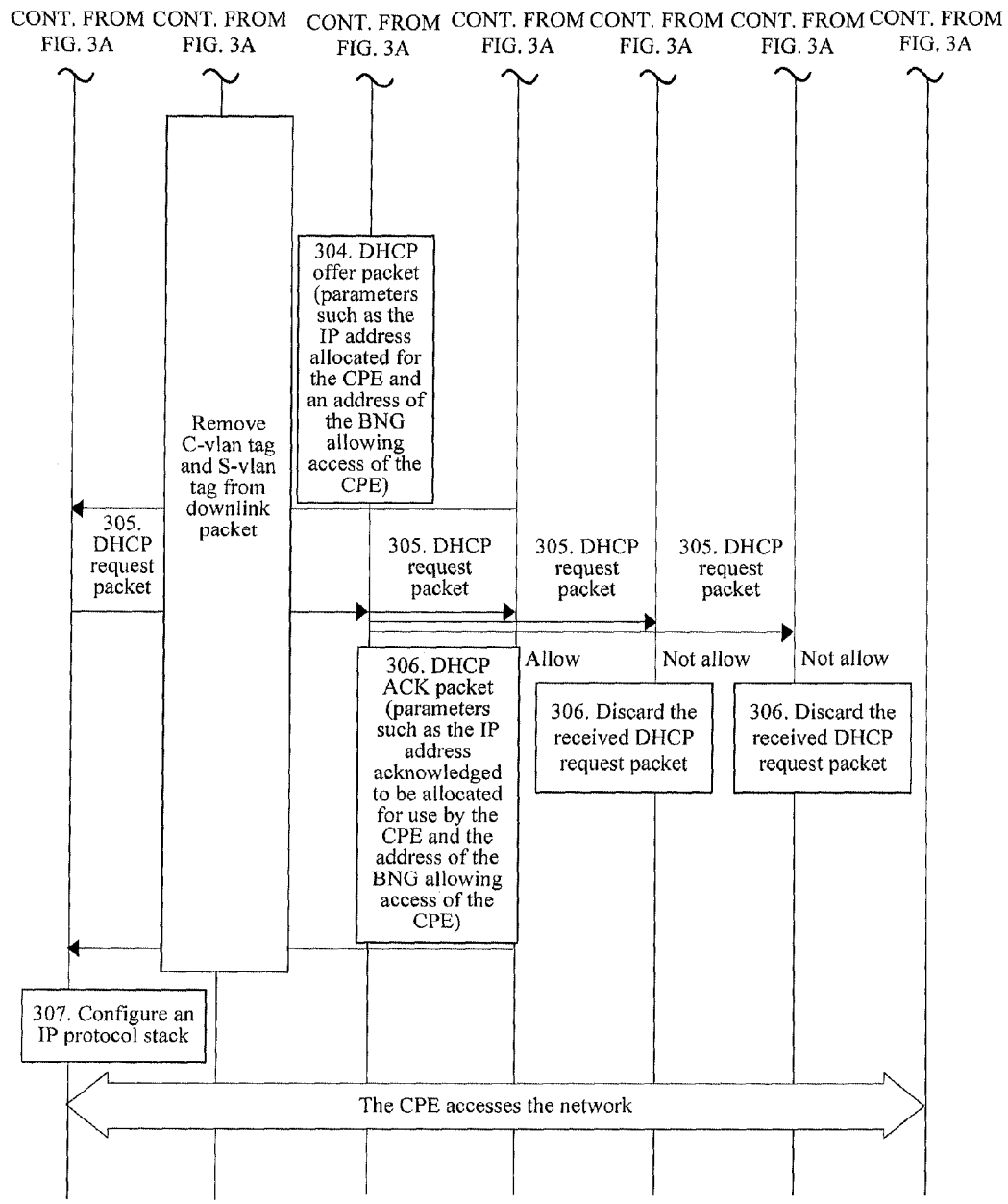

FIG. 3 and FIG. 3 (continued) illustrate a flow chart of still another embodiment of the access method of a customer premise equipment according to the present invention, where this embodiment is a further extension of the embodiments shown in FIG. 1 and FIG. 2. As shown in FIG. 3 and FIG. 3 (continued), the access method of a customer premise equipment may include:

Step 301: A CPE sends a DHCP discover (DHCP discover) packet to all BNGs in a BNG pool, where an S-vlan tag and a C-vlan tag are added to the DHCP discover packet on an AN.

Specifically, the CPE may broadcast the DHCP discover packet to all BNGs in the BNG pool.

Step 302: After receiving the DHCP discover packet, each BNG in the BNG pool obtains the S-vlan tag from the DHCP discover packet, obtains, according to the S-vlan tag, an access policy of a CPE group to which the CPE belongs, and determines, according to the access policy, whether to allow the CPE to access the BNG.

Specifically, if each BNG in the BNG pool determines that it has the highest access priority for the CPE group to which the CPE belongs, the BNG allows the CPE to access the BNG; otherwise, the BNG does not allow the CPE to access the BNG and discards the received DHCP discover packet.

Step 303: The BNG allowing access of the CPE performs authentication on the CPE, and after the authentication succeeds, allocates an address from an address pool for which the BNG has the highest management priority, for the CPE according to an address pool management policy.

Step 304: The BNG allowing access of the CPE sends a DHCP offer (DHCP offer) packet to the CPE, where the DHCP offer packet carries parameters such as the IP address allocated for the CPE and an address of the BNG allowing access of the CPE.

Step 305: After receiving the DHCP offer packet, the CPE sends a DHCP request (DHCP request) packet to all the BNGs in the BNG pool.

Specifically, the CPE may broadcast the DHCP request packet to all the BNGs in the BNG pool.

Step 306: The BNG allowing access of the CPE sends a DHCP ACK packet to the CPE, where the DHCP ACK packet carries parameters such as the IP address acknowledged to be allocated for use by the CPE and the address of the BNG allowing access of the CPE.

In this embodiment, the BNG not allowing access of the CPE discards the received DHCP request packet.

Step 307: The CPE configures an IP protocol stack according to the parameters carried in the DHCP ACK packet, such as the IP address acknowledged to be allocated for use by the CPE and the address of the BNG allowing access of the CPE. As such, the CPE can access the network, and communicate with other IP terminals on the network.

Through the above embodiment, a BNG in a BNG pool is enabled to provide an access service for a CPE according to an access policy, so that when a BNG in a BNG pool is faulty, a BNG that is not faulty in the BNG pool can provide an access service for a CPE originally accessing the faulty BNG thereby improving the reliability of the entire network.

In the BNG pool, in order to ensure that the CPE does not sense a faulty BNG in the BNG pool, access information of the CPE needs to be backed up to a backup BNG when the CPE accesses a serving BNG of the CPE. In this way, when the current serving BNG of the CPE is faulty, the backup BNG may serve as a new serving BNG to provide an access service for the CPE. The access information of the CPE includes a media access control (Media Access Control, hereinafter briefly referred to as MAC) address of the CPE and an IP address allocated for the CPE, so that the CPE can obtain the access service provided by the new serving BNG without reinitiating an access process.

Figure 4:
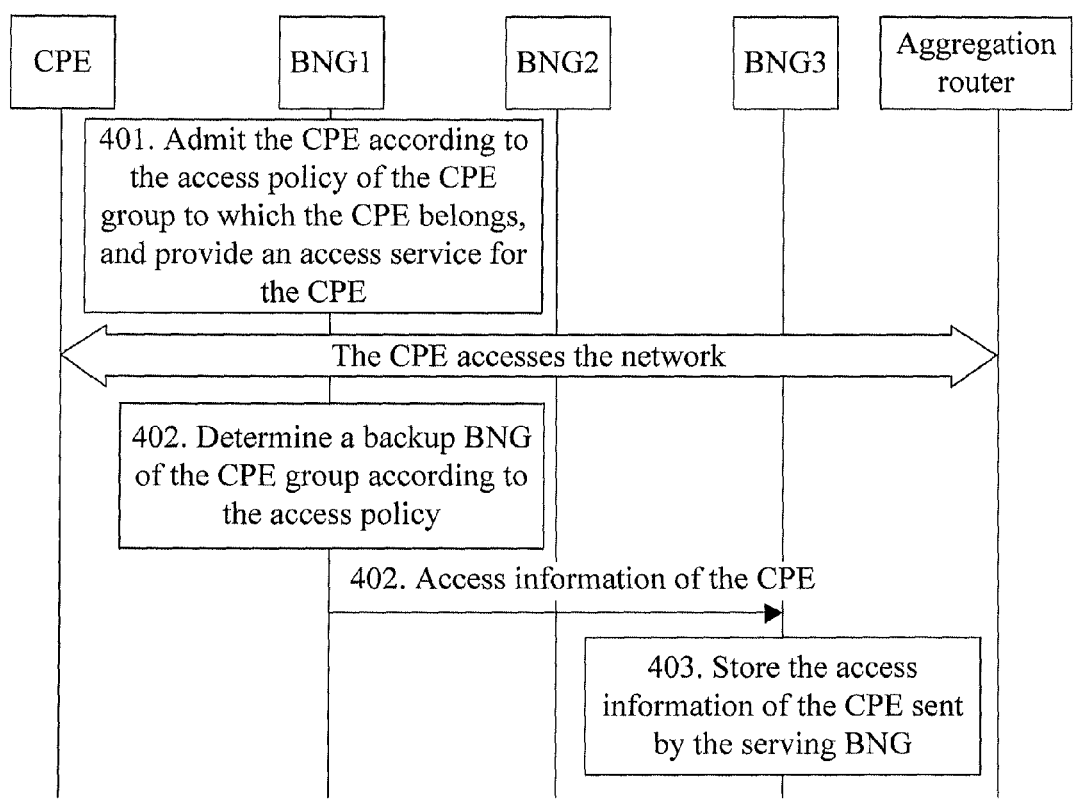
FIG. 4 is a flow chart of an embodiment of backup of access information of a CPE according to the present invention.

FIG. 4 is a flow chart of an embodiment of the backup of access information of a CPE according to the present invention, which further extends the embodiments shown in FIG. 1, FIG. 2, FIG. 3 and FIG. 3 (continued). After the BNG performs access control on the CPE according to the access policy in the embodiments, the method embodiments may further include the following steps, as shown in FIG. 4.

Step 401: The serving BNG of the CPE admits the CPE according to the access policy of the CPE group to which the CPE belongs, and provides an access service for the CPE.

This embodiment is illustrated by using an example in which the BNG pool includes 3 BNGs, namely, a BNG1, a BNG2 and a BNG3, and the serving BNG of the CPE is the BNG1.

Step 402: The serving BNG of the CPE determines a backup BNG of the CPE group according to the access policy, and sends the access information of the CPE to the backup BNG.

Specifically, the determining, by the serving BNG of the CPE, a backup BNG of the CPE group according to the access policy may be: determining, by the serving BNG according to the access policy, that a BNG having the second highest access priority for the CPE group is the backup BNG of the CPE group.

This embodiment is illustrated by using an example in which the backup BNG is the BNG3.

Step 403: The backup BNG stores the access information of the CPE sent by the serving BNG so as to provide an access service for the CPE according to the access information when the serving BNG is faulty.

Through the above embodiment, the access information of the CPE may be backed up to the backup BNG of the CPE, and therefore, when the serving BNG of the CPE is faulty, the backup BNG serves as a new serving BNG to provide an access service for the CPE, so that the CPE can obtain the access service provided by the new serving BNG without reinitiating an access process.

In the present invention, a fault detection mechanism is maintained among all the BNGs in the BNG pool, so that once a BNG in the BNG pool is faulty, one or more BNGs in the BNG pool except the faulty BNG can detect the fault in real time, and take over the faulty BNG to provide an access service for a CPE originally accessing the faulty BNG.

Figure 5:
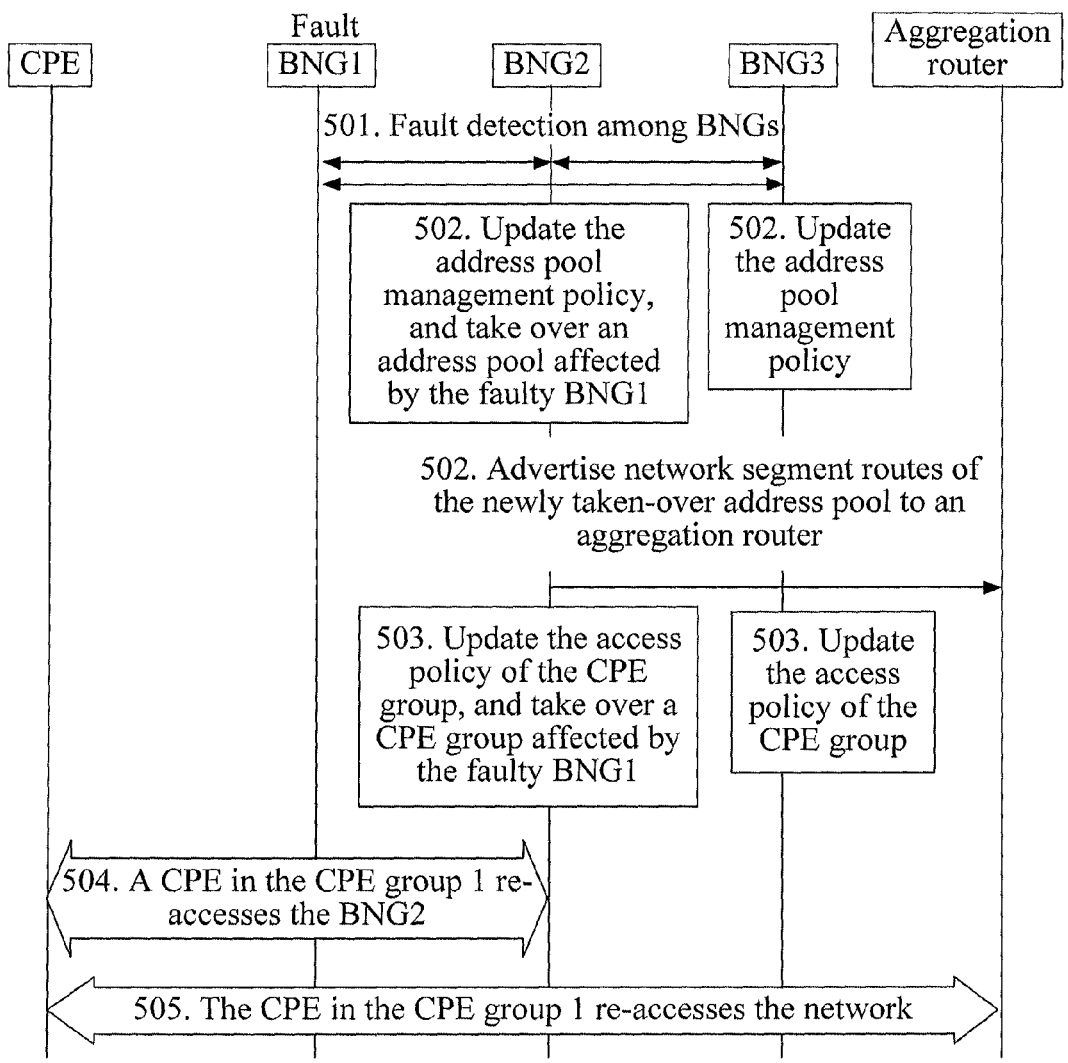
FIG. 5 is a flow chart of an embodiment of BNG fault handling according to the present invention.

FIG. 5 is a flow chart of an embodiment of BNG fault handling according to the present invention, which extends the methods in the embodiments in FIG. 1, FIG. 2, FIG. 3, FIG. 3 (continued) and FIG. 4. As shown in FIG. 5, on the basis of the embodiments shown in FIG. 1 to FIG. 4, the embodiment of the present invention may further include:

Step 501: Perform fault detection among all the BNGs in the BNG pool through a fault detection mechanism.

This embodiment is illustrated by using an example in which the BNG pool includes a BNG1, a BNG2 and a BNG3, and the BNG2 and the BNG3 detects that the BNG1 is faulty.

Step 502: After detecting that the BNG1 is faulty, the BNG2 and the BNG3 update the address pool management policy, take over an address pool affected by the faulty BNG1, and advertise a network segment route of the newly taken-over address pool to an aggregation router.

Specifically, the updating the address management policy may be: lowering the management priority of the faulty BNG for all address pools to the lowest, for example, 0; specifically, in this embodiment, lowering, by the BNG2 and the BNG3, the management priority of the BNG1 for all address pools to 0.

The taking over an address pool affected by the faulty BNG1 may be: taking over, by a BNG determining that the BNG currently has the highest management priority for the address pool affected by the faulty BNG1 among the BNG2 and the BNG3, the address pool affected by the faulty BNG1. For example, referring to Table 3, when the BNG1 works normally, the BNG1 has the highest management priority for the address pool 1, that is, the address pool 1 is managed by the BNG1, so that once the BNG1 is faulty, the address pool 1 is affected by the faulty BNG1, that is, the address pool 1 is the address pool affected by the faulty BNG1. In addition, once the BNG1 is faulty, the management priority of the BNG1 for all address pools is lowered to 0. At this time, because the management priority of the BNG2 for the address pool 1 is 80, and the management priority of the BNG3 for the address pool 1 is 60, the BNG2 is a BNG currently having the highest management priority for the address pool 1, and therefore, the BNG2 takes over the address pool 1, and advertises a network segment route of the newly taken-over address pool 1 to an aggregation router.

Step 503: After detecting that the BNG1 is faulty, the BNG2 and the BNG3 update the access policy of the CPE group, and take over a CPE group affected by the faulty BNG1.

Specifically, the updating the access policy of the CPE group may be: lowering access priority of the faulty BNG for all CPE groups to the lowest, for example, 0; specifically in this embodiment, lowering the access priority of the BNG1 for all CPE groups to 0.

The taking over a CPE group affected by the faulty BNG1 may be: allowing, by a BNG determining that the BNG currently has the highest access priority for the CPE group affected by the faulty BNG1 among the BNG2 and the BNG3, a CPE in the CPE group to access the BNG. For example, referring to Table 1, when the BNG1 works normally, the BNG1 has the highest access priority for the CPE group 1, that is, a CPE in the CPE group 1 accesses the BNG1, so that once the BNG1 is faulty, the CPE group 1 will be affected by the faulty BNG1, that is, the CPE group 1 is the CPE group affected by the faulty BNG1. In addition, once the BNG1 is faulty, access priority of the BNG1 for all CPE groups is lowered to 0. At this time, since the management priority of the BNG2 for the CPE group 1 is 80, and the management priority of the BNG3 for the CPE group 1 is 60, the BNG2 is a BNG currently having the highest management priority for the CPE group 1, and therefore, the BNG2 takes over the CPE group 1.

In this embodiment, step 502 and step 503 may be executed in parallel or in sequence, and this embodiment does not limit the execution sequence of step 502 and step 503.

Step 504: A CPE in the CPE group 1 re-accesses the BNG2.

Step 505: The CPE in the CPE group 1 re-accesses the network, and communicate with other IP terminals on the network.

Through the above embodiment, when a BNG in a BNG pool is faulty, a BNG that is not faulty in the BNG pool can provide an access service for a CPE originally accessing the faulty BNG, thereby improving the reliability of the entire network.

Figure 6:
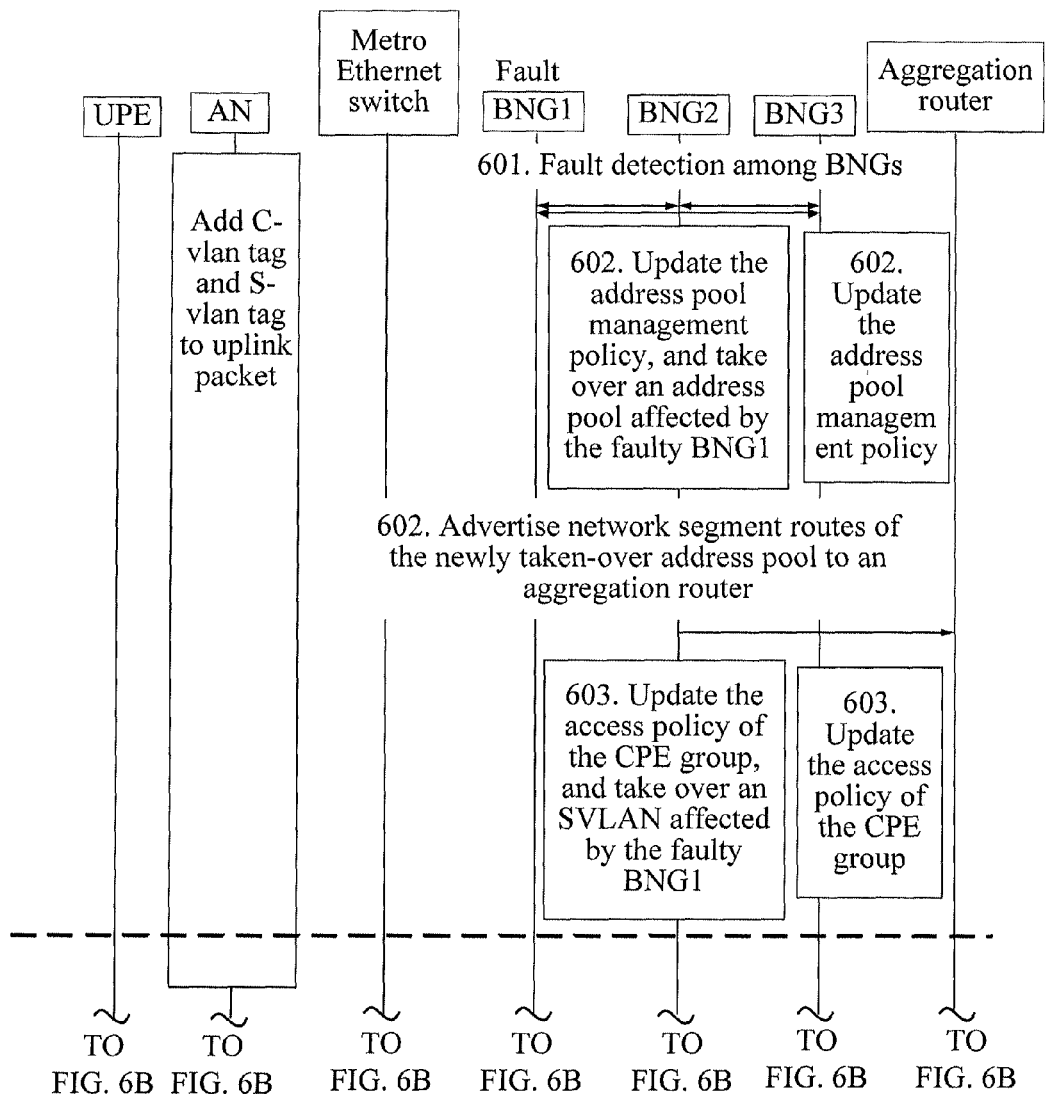
FIG. 6 and FIG. 6 (continued) illustrate a flow chart of another embodiment of BNG fault handling according to the present invention.
Figure 6:
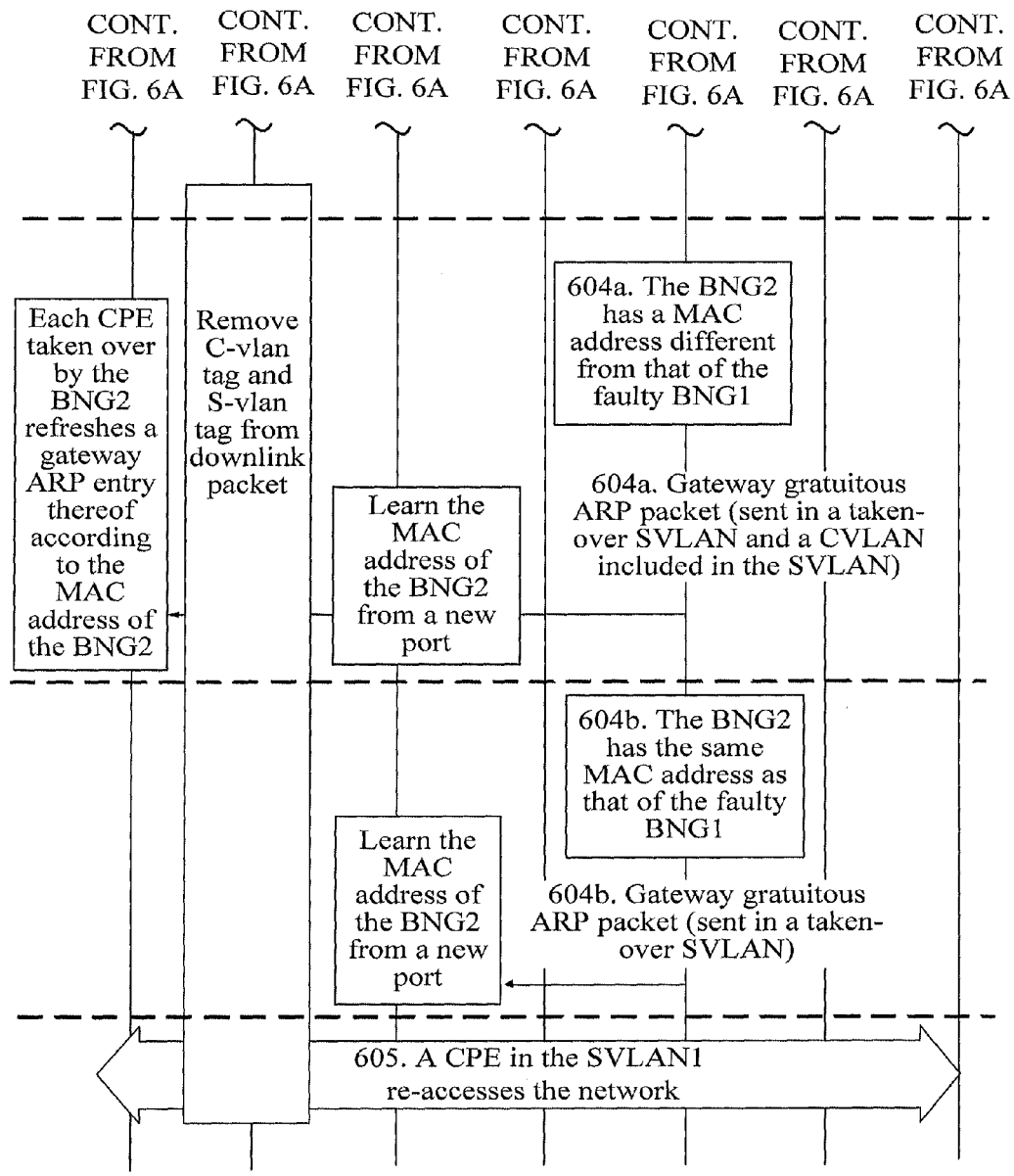

FIG. 6 and FIG. 6 (continued) illustrate a flow chart of another embodiment of BNG fault handling according to the present invention. This embodiment introduces BNG fault handling in the case of supporting real-time backup of CPE access data when the granularity of the CPE group is an SVLAN, and is a further extension of the embodiment shown in FIG. 5.

As shown in FIG. 6 and FIG. 6 (continued), this embodiment may include:

Step 601 to step 602, which are the same as step 501 to step 502.

Step 603: After detecting that the BNG1 is faulty, the BNG2 and the BNG3 update the access policy of the CPE group, and take over an SVLAN affected by the faulty BNG1.

Specifically, the updating the access policy of the CPE group may be: lowering the access priority of the faulty BNG for all SVLANs to the lowest, for example, 0; specifically, in this embodiment, lowering, by the BNG2 and the BNG3, the access priority of the BNG1 for all SVLANs to 0.

The taking over an SVLAN affected by the faulty BNG1 may be: using a BNG determining that the BNG currently has the highest priority for the SVLAN affected by the faulty BNG1 among the BNG2 and the BNG3 as a backup BNG of the SVLAN, and reconstructing, by the backup BNG, data paths of all CPEs according to stored access information of all the CPEs in the SVLAN.

For example, referring to Table 1, when the BNG1 works normally, the BNG1 has the highest access priority for the CPE group 1, that is, the SVLAN 1, that is, CPEs in the SVLAN 1 access the BNG1, so that once the BNG1 is faulty, the SVLAN 1 is affected by the faulty BNG1, that is, the SVLAN 1 is the CPE group affected by the faulty BNG1. In addition, once the BNG1 is faulty, the access priority of the BNG1 for all SVLANs is lowered to 0. At this time, because the management priority of the BNG2 for the SVLAN 1 is 80, and the management priority of the BNG3 for the SVLAN 1 is 60, the BNG2 is a BNG currently having the highest management priority for the SVLAN 1, and therefore, the BNG2 is a backup BNG of the SVLAN 1, and the BNG2 reconstructs data paths of all CPEs in the SVLAN 1 according to stored access information of all the CPEs in the SVLAN 1.

Step 604a: If a MAC address of the BNG2 is different from that of the faulty BNG1, the BNG2 sends a gateway gratuitous ARP packet in a taken-over SVLAN and a CVLAN included in the SVLAN, where the gateway gratuitous ARP packet is used for notifying the MAC address of the BNG2, so that a metro Ethernet switch learns the MAC address of the BNG2 from a new port, and each CPE taken over by the BNG2 refreshes a gateway ARP entry thereof according to the MAC address of the BNG2; or, Step 604b: If a MAC address of the BNG2 is the same as that of the faulty BNG1, the BNG2 sends a gateway gratuitous ARP packet in a taken-over SVLAN, where the gateway gratuitous ARP packet is used for notifying the MAC address of the BNG2, so that a metro Ethernet switch learns the MAC address of the BNG2 from a new port.

Step 605: A CPE in the SVLAN1 re-accesses the network.

Through the above embodiment, when the serving BNG of the CPE is faulty, the backup BNG serves as a new serving BNG to provide an access service for the CPE, so that the CPE can obtain the access service provided by the new serving BNG without reinitiating an access process.

A person skilled in the art may understand that all or part of the steps of the method according to the embodiments of the present invention may be implemented by a program instructing relevant hardware. The program may be stored in a computer readable storage medium. When the program is executed, the steps of the method according to the embodiments are performed. The storage medium may be any medium that is capable of storing program codes, such as a ROM, a RAM, a magnetic disk, or an optical disk.

Figure 7:
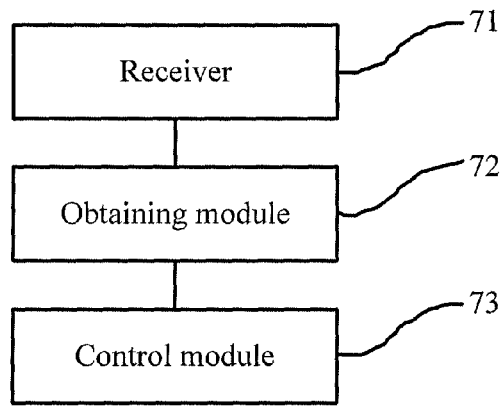
FIG. 7 is a schematic structural diagram of an embodiment of a broadband network gateway according to the present invention.

FIG. 7 is a schematic structural diagram of an embodiment of a broadband network gateway according to the present invention. The BNG in this embodiment may implement the process of the embodiment of the present invention shown in FIG. 1, and the BNG in this embodiment may be a BNG in a BNG pool. The BNG may include: a receiver 71, an obtaining module 72 and a control module 73.

The receiver 71 is configured to receive an access request packet sent by a CPE, where the access request packet carries an identifier of a CPE group to which the CPE belongs.

The obtaining module 72 is configured to obtain an access policy of the CPE group according to the identifier of the CPE group received by the receiver 71.

The control module 73 is configured to perform access control on the CPE according to the access policy obtained by the obtaining module 72. Specifically, the control module 73 may allow, according to the access policy, the CPE to access the BNG, if the BNG has the highest access priority for the CPE group. Further, if the BNG does not have the highest access priority for the CPE group, the control module 73 may discard the access request packet.

In the BNG, after the receiver 71 receives an access request packet sent by a CPE that carries an identifier of a CPE group to which the CPE belongs, the obtaining module 72 may obtain an access policy of the CPE group according to the identifier of the CPE group, and then the control module 73 may perform access control on the CPE according to the access policy. In this way, a BNG in a BNG pool is enabled to provide an access service for a CPE according to an access policy, so that when a BNG in a BNG pool is faulty, a BNG that is not faulty in the BNG pool can provide an access service for a CPE originally accessing the faulty BNG, thereby improving the reliability of the entire network.

Figure 8:
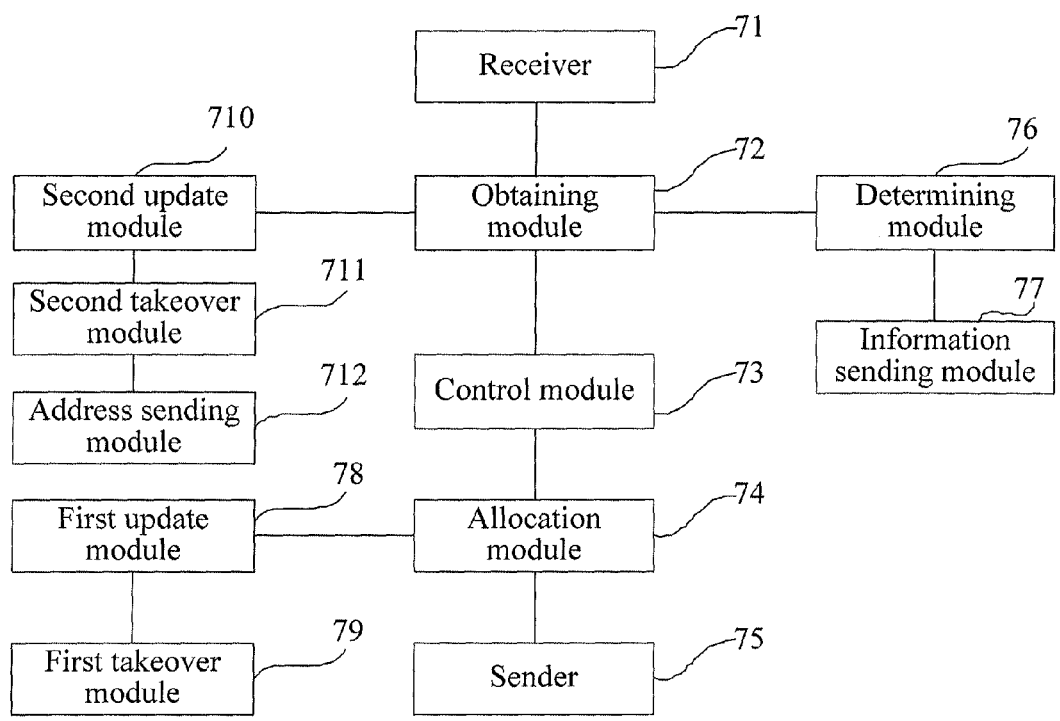
FIG. 8 is a schematic structural diagram of another embodiment of the broadband network gateway according to the present invention.

FIG. 8 is a schematic structural diagram of another embodiment of the broadband network gateway according to the present invention. Different from the broadband network gateway shown in FIG. 7, in an implementation manner shown in FIG. 8, the BNG may further include:

an allocation module 74, configured to: if the control module 73 allows the CPE to access the BNG, allocate an address from an address pool for the CPE according to an address pool management policy; where specifically, the allocation module 74 may allocate an address from an address pool for which the BNG has the highest management priority, for the CPE according to the address pool management policy; and a sender 75, configured to send the address allocated by the allocation module 74 for the CPE and an address of the BNG to the CPE, so that the CPE accesses the BNG.

In another implementation manner of this embodiment, the BNG may further include:

a determining module 76, configured to: if the control module 73 allows the CPE to access the BNG, determine a backup BNG of the CPE group according to the access policy of the CPE group; where specifically, the determining module 76 may determine, according to the access policy of the CPE group, that a BNG having the second highest access priority for the CPE group is the backup BNG of the CPE group; and an information sending module 77, configured to send access information of the CPE to the backup BNG.

In still another implementation manner of this embodiment, the BNG may further include:

a first update module 78, configured to, update the address pool management policy when it is detected that a BNG in the BNG pool is faulty; where specifically, the first update module 78 may lower a management priority of the faulty BNG for all address pools to the lowest; and a first takeover module 79, configured to take over an address pool affected by the faulty BNG, and advertise a network segment route of the taken-over address pool to an aggregation router; where specifically, the first takeover module 79 may take over the address pool affected by the faulty BNG when it is determined that the BNG currently has the highest management priority for the address pool affected by the faulty BNG.

In another implementation manner of this embodiment, the BNG may further include:

a second update module 710, configured to update the access policy when it is detected that a BNG in the BNG pool is faulty; where specifically, the second update module 710 may lower an access priority of the faulty BNG for all CPE groups to the lowest; and a second takeover module 711, configured to take over a CPE group affected by the faulty BNG.

Specifically, when it is determined that the BNG currently has the highest access priority for the CPE group affected by the faulty BNG, the second takeover module 711 may allow a CPE in the CPE group affected by the faulty BNG to access the BNG; or when the CPE group is an SVLAN, if it is determined that the BNG currently has the highest access priority for the SVLAN affected by the faulty BNG, the second takeover module 711 may reconstruct data paths of all CPEs in the SVLAN according to access information of all the CPEs in the SVLAN which is stored therein. At this time, the BNG may further include:

an address sending module 712, configured to: if the BNG has a MAC address different from that of the faulty BNG, send a gateway gratuitous ARP packet in a taken-over SVLAN and a CVLAN included in the taken-over SVLAN, where the gateway gratuitous ARP packet is used for notifying the MAC address of the BNG, so that a metro Ethernet switch learns the MAC address of the BNG from a new port, and a CPE in the SVLAN refreshes a gateway address ARP entry thereof according to the MAC address of the BNG; or if the BNG has the same MAC address as that of the faulty BNG, send a gateway gratuitous ARP packet in a taken-over SVLAN, where the gateway gratuitous ARP packet is used for notifying the MAC address of the BNG, so that a metro Ethernet switch learns the MAC address of the BNG from a new port.

In a specific implementation, the BNG may include modules in one or more of the implementation manners described above, which is not limited in this embodiment; however, FIG. 8 shows an example in which the BNG includes modules in all of the implementation manners described above.

Through the BNG, a BNG in a BNG pool is enabled to provide an access service for a CPE according to an access policy, so that when a BNG in a BNG pool is faulty, a BNG that is not faulty in the BNG pool can provide an access service for a CPE originally accessing the faulty BNG, thereby improving the reliability of the entire network.

Figure 9:
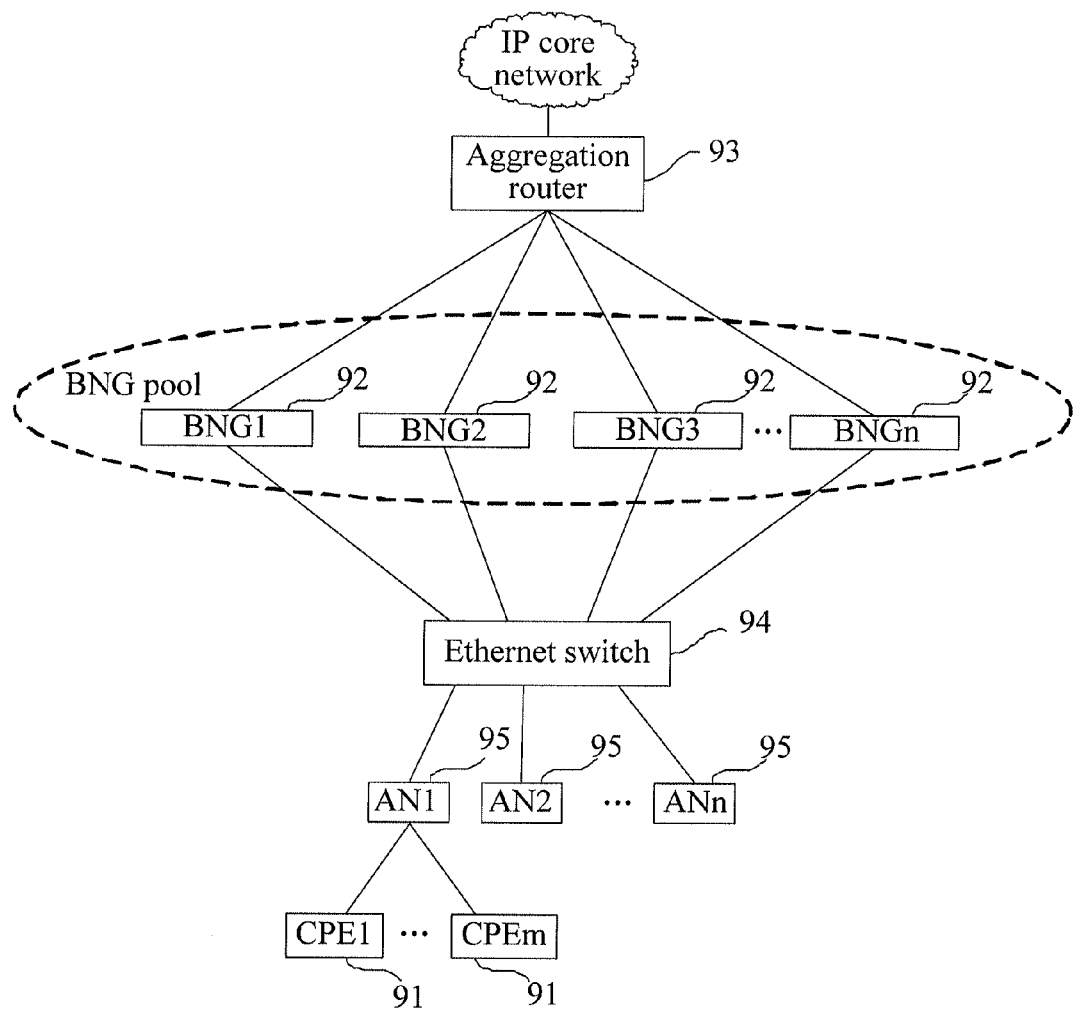
FIG. 9 is a schematic structural diagram of an embodiment of an access system of a customer premise equipment according to the present invention.

FIG. 9 is a schematic structural diagram of an embodiment of an access system of a customer premise equipment according to the present invention. As shown in FIG. 9, the system may include: a CPE 91 and at least two BNGs 92.

Specifically, the at least two BNGs 92 may receive an access request packet sent by the CPE 91, where the access request packet carries an identifier of a CPE group to which the CPE 91 belongs, obtain an access policy of the CPE group according to the identifier of the CPE group, and perform access control on the CPE 91 according to the access policy. In this embodiment, the at least two BNGs 92 form a BNG pool, and each BNG 92 in the at least two BNGs 92 may be implemented by the BNG shown in FIG. 7 or FIG. 8 of the present invention, which will not be described in detail herein again.

In an implementation manner of this embodiment, further, the system may also include: an aggregation router 93, an Ethernet switch 94, and an access node 95.

Specifically, the access request packet sent by the CPE 91 is sent to the BNG 92 through the access node 95 and the Ethernet switch 94. The Ethernet switch 94 in this embodiment may be a metro Ethernet switch.

After the CPE 91 accesses the BNG 92, an uplink packet of the CPE 91 is sent to the BNG 92 through the access node 95 and the Ethernet switch 94, and then sent by the BNG 92 to an IP core network through the aggregation router 93; in contrast, a downlink packet sent by the IP core network to the CPE 91 is sent to the BNG 92 through the aggregation router 93, and then sent by the BNG 92 to the CPE 91 through the Ethernet switch 94 and the access node 95.

In this embodiment, FIG. 9 shows an example in which the system includes m CPEs 91, n access nodes 95, and n BNGs 92, where m and n are positive integers, m≥2, and n≥2.

Through the access system of a customer premise equipment, the BNG 92 in the BNG pool is enabled to provide an access service for the CPE 91 according to the access policy, so that when a BNG 92 in the BNG pool is faulty, a BNG 92 that is not faulty in the BNG pool can provide an access service for the CPE originally accessing the faulty BNG 92, thereby improving the reliability of the entire network.

It should be understood by persons skilled in the art that the accompanying drawings are merely schematic diagrams of an exemplary embodiment, and modules or processes in the accompanying drawings are not necessarily required in implementing the present invention.

Those skilled in the art may understand that the modules in the apparatuses provided in the embodiments may be arranged in the apparatuses in a distributed manner according to the description of the embodiments, or may be arranged in one or multiple apparatuses which are different from those described in the embodiments. The modules in the embodiments may be combined into one module, or split into multiple sub-modules.

Finally, it should be noted that the above embodiments are merely intended for describing the technical solutions of the present invention other than limiting the present invention. Although the present invention is described in detail with reference to the foregoing embodiments, a person skilled in the art should understand that they can still make modifications to the technical solutions described in the foregoing embodiments, or make equivalent substitutions to some or all the technical features thereof, without departing from the spirit and scope of the technical solutions of the embodiments of the present invention.

What is claimed is:

1. An access method of a customer premise equipment, comprising:
   receiving, by a broadband network gateway, an access request packet sent by a customer premise equipment, wherein the access request packet carries an identifier that identifies a customer premise equipment group, wherein the customer premise equipment group comprises at least the customer premise equipment and another customer premise equipment, wherein the identifier that identifies the customer premise equipment group is different from an identifier of the customer premise equipment; and
   obtaining, by the broadband network gateway, an access policy of the customer premise equipment group according to the identifier that identifies the customer premise equipment group, and performing access control on the customer premise equipment according to the access policy.

2. The method according to claim 1, wherein the performing access control on the customer premise equipment according to the access policy comprises:
   when the broadband network gateway has a highest access priority for the customer premise equipment group, allowing, by the broadband network gateway according to the access policy, the customer premise equipment to access the broadband network gateway.

3. The method according to claim 1, wherein the performing access control on the customer premise equipment according to the access policy comprises:
   when the broadband network gateway does not have the highest access priority for the customer premise equipment group, discarding, by the broadband network gateway, the access request packet.

4. The method according to claim 1, wherein after the performing access control on the customer premise equipment according to the access policy, the method further comprises:
   when the broadband network gateway allows the customer premise equipment to access the broadband network gateway, allocating, by the broadband network gateway, an address for the customer premise equipment from an address pool according to an address pool management policy, and sending the address allocated for the customer premise equipment and an address of the broadband network gateway to the customer premise equipment.

5. The method according to claim 4, wherein the allocating, by the broadband network gateway, an address from an address pool for the customer premise equipment according to an address pool management policy comprises:
   allocating, by the broadband network gateway, the address for the customer premise equipment from an address pool for which the broadband network gateway has the highest management priority, according to the address pool management policy.

6. The method according to claim 1, wherein after the performing access control on the customer premise equipment according to the access policy, the method further comprises:
   when the broadband network gateway allows the customer premise equipment to access the broadband network gateway, determining, by the broadband network gateway, a backup broadband network gateway of the customer premise equipment group according to the access policy of the customer premise equipment group, and sending access information of the customer premise equipment to the backup broadband network gateway.

7. The method according to claim 6, wherein the determining, by the broadband network gateway, a backup broadband network gateway of the customer premise equipment group according to the access policy of the customer premise equipment group comprises:
   determining, by the broadband network gateway according to the access policy of the customer premise equipment group, that a broadband network gateway having a second highest access priority for the customer premise equipment group is the backup broadband network gateway of the customer premise equipment group.

8. The method according to claim 1, further comprising:
   when it is detected that a first broadband network gateway in a broadband network gateway pool comprising the broadband network gateway is faulty, performing the following:
      updating, by one or more other broadband network gateways in the broadband network gateway pool except the first broadband network gateway, the address pool management policy;
      taking over an address pool affected by the first broadband network gateway; and
      advertising a network segment route of the taken-over address pool to an aggregation router.

9. The method according to claim 8, wherein the updating the address pool management policy comprises:
   lowering a management priority of the first broadband network gateway for all address pools to the lowest.

10. The method according to claim 9, wherein the taking over an address pool affected by the first broadband network gateway comprises:
    taking over, by a second broadband network gateway among the one or more other broadband network gateways, the address pool affected by the first broadband network gateway, wherein the second broadband network gateway is a broadband network gateway currently having the highest management priority for the address pool affected by the first broadband network gateway.

11. The method according to claim 1, further comprising:
    when it is detected that a first broadband network gateway in a broadband network gateway pool comprising the broadband network gateway is faulty, performing the following:
       updating, by one or more other broadband network gateways in the broadband network gateway pool except the first broadband network gateway, the access policy; and
       taking over a customer premise equipment group affected by the first broadband network gateway.

12. The method according to claim 11, wherein the updating the access policy comprises:
    lowering an access priority of the first broadband network gateway for all customer premise equipment groups to the lowest.

13. The method according to claim 12, wherein the taking over a customer premise equipment group affected by the first broadband network gateway comprises:
    allowing, by a second broadband network gateway among the one or more other broadband network gateways, a customer premise equipment in the customer premise equipment group affected by the first broadband network gateway to access the second broadband network gateway, wherein the second broadband network gateway is a broadband network gateway currently having the highest access priority for the customer premise equipment group affected by the first broadband network gateway.

14. The method according to claim 12, wherein the customer premise equipment group comprises a service virtual local area network; and
    the taking over a customer premise equipment group affected by the first broadband network gateway comprises:
    reconstructing, by a second broadband network gateway which determines that the second broadband network gateway currently has the highest access priority for the service virtual local area network affected by the first broadband network gateway among the one or more other broadband network gateways, wherein data paths of all customer premise equipments in the service virtual local area network which are according to access information of all the customer premise equipments in the service virtual local area network are stored in the second broadband network gateway (BNG).

15. The method according to claim 14, further comprising:
    when a media access control address of the second broadband network gateway is different from that of the first broadband network gateway, performing the following:
       sending, by the second broadband network gateway, a gateway gratuitous address resolution protocol packet in the taken-over service virtual local area network and a customer virtual local area network comprised in the taken-over service virtual local area network, wherein the gateway gratuitous address resolution protocol packet is used for notifying the media access control address of the second broadband network gateway, so that a metro Ethernet switch learns the media access control address of the second broadband network gateway from a new port, and a customer premise equipment in the service virtual local area network refreshes a gateway address resolution protocol entry thereof according to the media access control address of the second broadband network gateway; or, if a media access control address of the second broadband network gateway is the same as that of the first broadband network gateway, performing the following:

sending, by the second broadband network gateway, a gateway gratuitous address resolution protocol packet in the taken-over service virtual local area network, wherein the gateway gratuitous address resolution protocol packet is used for notifying the media access control address of the second broadband network gateway, so that a metro Ethernet switch learns the media access control address of the second broadband network gateway from a new port.

16. A non-transitory computer readable medium, comprising instruction codes which, when executed by a broadband network gateway, cause the broadband network gateway to:

receive an access request packet sent by a customer premise equipment, wherein the access request packet carries an identifier that identifies a customer premise equipment group, wherein the customer premise equipment group comprising at least comprises the customer premise equipment and at least another customer premise equipment, wherein the identifier that identifies the customer premise equipment group is different from an identifier of the customer premise equipment;

obtain an access policy of the customer premise equipment group according to the identifier that identifies the customer premise equipment group; and perform access control on the customer premise equipment according to the access policy.

17. The non-transitory computer readable medium-according to claim 16, wherein the codes cause the broadband network gateway to:

upon that the broadband network gateway has a highest access priority for the customer premise equipment group, allow, according to the access policy, the customer premise equipment to access the broadband network gateway.

18. The non-transitory computer readable medium according to claim 16, wherein the codes cause the broadband network gateway to:

upon that the broadband network gateway does not have the highest access priority for the customer premise equipment group, discard the access request packet.

19. The non-transitory computer readable medium according to claim 16, wherein the codes cause the broadband network gateway to:

upon that the customer premise equipment is allowed to access the broadband network gateway, allocate an address from an address pool for the customer premise equipment according to an address pool management policy; and send the address allocated for the customer premise equipment and an address of the broadband network gateway to the customer premise equipment.

20. The non-transitory computer readable medium according to claim 19, wherein the codes cause the broadband network gateway to:

allocate an address from an address pool for which the broadband network gateway has the highest management priority, for the customer premise equipment according to the address pool management policy.

21. The non-transitory computer readable medium according to claim 16, wherein the codes cause the broadband network gateway to:

upon that the customer premise equipment is allowed to access the broadband network gateway, determine a backup broadband network gateway of the customer premise equipment group according to the access policy of the customer premise equipment group; and send access information of the customer premise equipment to the backup broadband network gateway.

22. The non-transitory computer readable medium according to claim 16, wherein the codes cause the broadband network gateway to:

determine, according to the access policy of the customer premise equipment group, that a broadband network gateway having a second highest access priority for the customer premise equipment group is the backup broadband network gateway of the customer premise equipment group.

23. The non-transitory computer readable medium according to claim 16, wherein the codes cause the broadband network gateway to:

update the address pool management policy when it is detected that a broadband network gateway in a broadband network gateway pool is faulty; and take over an address pool affected by the faulty broadband network gateway, and advertise a network segment route of the taken-over address pool to an aggregation router.

24. The non-transitory computer readable medium according to claim 23, wherein the codes cause the broadband network gateway to:

lower a management priority of the faulty broadband network gateway for all address pools to the lowest.

25. The non-transitory computer readable medium according to claim 24, wherein the codes cause the broadband network gateway to:

when it is determined that the broadband network gateway currently has the highest management priority for the address pool affected by the faulty broadband network gateway, take over the address pool affected by the faulty broadband network gateway.

26. The non-transitory computer readable medium according to claim 16, wherein the codes cause the broadband network gateway to:

update the access policy when it is detected that a broadband network gateway in a broadband network gateway pool is faulty; and take over a customer premise equipment group affected by the faulty broadband network gateway.

27. The non-transitory computer readable medium according to claim 26, wherein the codes cause the broadband network gateway to:

lower an access priority of the faulty broadband network gateway for all customer premise equipment groups to the lowest.

28. The non-transitory computer readable medium according to claim 27, wherein the codes cause the broadband network gateway to:

when it is determined that the broadband network gateway currently has the highest access priority for the customer premise equipment group affected by the faulty broadband network gateway, allow a customer premise equipment in the customer premise equipment group affected by the faulty broadband network gateway to access the broadband network gateway.

29. The non-transitory computer readable medium according to claim 27, wherein the codes cause the broadband network gateway to:

when the customer premise equipment group is a service virtual local area network, when it is determined that the broadband network gateway currently has the highest access priority for the service virtual local area network affected by the faulty broadband network gateway, reconstruct data paths of all customer premise equipments in the service virtual local area network according to access information of all the customer premise equipments in the service virtual local area network which are stored in the second broadband network gateway (BNG).

30. The non-transitory computer readable medium according to claim 29, wherein the codes cause the broadband network gateway to:

upon that a media access control address of the broadband network gateway is different from that of the faulty broadband network gateway, send a gateway gratuitous address resolution protocol packet in the taken-over service virtual local area network and a customer virtual local area network comprised in the taken-over service virtual local area network, wherein the gateway gratuitous address resolution protocol packet is used for notifying the media access control address of the broadband network gateway, so that a metro Ethernet switch learns the media access control address of the broadband network gateway from a new port, and a customer premise equipment in the service virtual local area network refreshes a gateway address resolution protocol entry thereof according to the media access control address of the broadband network gateway; or upon that a media access control address of the broadband network gateway is the same as that of the faulty broadband network gateway, send a gateway gratuitous address resolution protocol packet in the taken-over service virtual local area network, wherein the gateway gratuitous address resolution protocol packet is used for notifying the media access control address of the broadband network gateway, so that a metro Ethernet switch learns the media access control address of the broadband network gateway from a new port.

* * * * *